United States Patent [19]

Pietras

[11] Patent Number: 4,971,289
[45] Date of Patent: Nov. 20, 1990

[54] VALVE ASSEMBLY AND LOCKING MEANS THEREFOR

[75] Inventor: Eugene E. Pietras, Liverpool, N.Y.

[73] Assignee: Niagara Mohawk Power Corporation, Syracuse, N.Y.

[21] Appl. No.: 442,603

[22] Filed: Nov. 29, 1989

[51] Int. Cl.$^5$ ............................................. F16K 35/06
[52] U.S. Cl. ....................................... 251/90; 70/177; 70/180; 251/95; 251/104; 137/385; 411/120
[58] Field of Search ................. 70/176, 177, 178, 179, 70/180; 137/385; 251/90, 93, 95, 104, 111, 113, 292; 411/108, 119, 120

[56] References Cited

U.S. PATENT DOCUMENTS

| | | | |
|---|---|---|---|
| Re. 7,598 | 4/1877 | Hall | 137/385 |
| 932,437 | 8/1909 | Brady | 137/385 |
| 991,479 | 5/1911 | Cathels | 137/385 |
| 1,123,858 | 1/1915 | Deckebach | 137/385 |
| 1,238,073 | 8/1917 | Hollar | 137/385 |
| 1,495,630 | 5/1924 | Bees | 137/385 |
| 1,890,744 | 12/1932 | Noonan | 70/180 |
| 3,186,196 | 6/1965 | Moberg | 70/177 |
| 3,865,130 | 2/1975 | Mullis | 137/385 |
| 3,976,095 | 8/1976 | Koch et al. | 137/385 |

OTHER PUBLICATIONS

Litton, "Ball Valve Locking Device", Nov. 28, 1978.

Primary Examiner—George L. Walton
Attorney, Agent, or Firm—Lalos & Keegan

[57] ABSTRACT

A valve assembly comprising a valve having a housing and a valve element disposed in the housing and movable between closed and open positions, the valve element having a nut portion and a wing portion, the nut portion projecting out of the housing and having a cross-sectional configuration such that a tool may be applied for turning the valve element between the closed and open positions, the wing portion being movable between a first position when the valve element is in the closed position and a second position when the valve element is in the open position, the housing having a wing portion provided with an opening therein disposed in lockable relation with the valve element wing portion when the valve element wing portion is in its first position, a barrel lock removably mountable in registered openings of the wing portions when the valve element wing portion is in its first position whereby the valve element will be locked in the closed position, and a rigid member having first means cooperable with the nut portion for securing the rigid member to the valve element when the valve element securing portion is in the second position, and second securing means spaced from the first securing means cooperable with the housing securing portion and the barrel lock for locking the rigid member to the housing securing portion when the valve element securing portion is in the second position, whereby the valve element will be locked in the open position.

21 Claims, 2 Drawing Sheets

VALVE ASSEMBLY AND LOCKING MEANS THEREFOR

This invention relates to an improved valve assembly and more particularly to an improved valve assembly adapted for use in systems for controlling the flow of fluids such as natural gas, oil, water and the like. The invention further contemplates a novel assembly for a valve that is capable of locking the valve in either the open or closed position. In addition, the invention contemplates a novel adapter for a conventional lockwing type of valve that renders the valve capable of being locked in the open position in addition to the closed position. Reference is hereby made to my copending application for Valve Assembly and Locking Means Therefor, U.S. Pat. application, Ser. No. 07/352,295, filed May 16, 1989.

In systems for distributing fluid such as natural gas, oil, water and the like, there usually is provided plug type valves for controlling the flow of fluid. Such valves typically have open and closed positions. In some applications because of governmental requirements, such type of valve is required to have the capability of being locked in the closed position. As a result of such requirement, there has been developed in the prior art a type of plug valve commonly known as a lockwing plug valve which includes a housing having a valve chamber provided with inlet and outlet ports, and a valve element disposed in the valve chamber provided with a fluid passageway disposable in a first position intercommunicating the inlet and outlet ports to permit the flow of fluid through the valve and in a second position barring communication between the ports to preclude the flow of fluid through the valve. The head portion of the valve element is provided with an operating nut to accommodate a wrench for pivoting the valve seat between the open and closed positions about the turning axis of the valve element, and a locking wing portion which projects laterally or radially relative to the turning axis of the valve seat. The valve element wing portion is provided with an opening adapted to register with an opening in a fixed wing portion of the valve housing when the valve element is in the closed position to allow the application of a barrel-type lock to the two wing portions, with a reduced, intermediate portion of the barrel lock extending through the registered wing openings, thus locking the valve element in the closed position. In natural gas distribution systems of public utilities, literally hundreds of thousands of such types of valves have been installed and are in service.

More recently, certain governmental rules and regulations applicable to the natural gas utility industry have been enacted in several states that require valves installed in gas distribution systems to have the capability of being locked not only in the closed position but also in the open position. Compliance with such new rules and regulations has necessitated either the replacement of all of such valves in a system with valves of a new design or the modification of valves in service to provide the capability of being locked in either the open or closed position.

Responding to the new code requirements, valve manufacturers have developed either new valve designs providing the capability of locking a valve in either the open or closed position or various valve attachments which are designed to preclude access to the operating mechanism of a valve. Included in such new designs is a double lockwing valve which is similar to the aforementioned lockwing valve but is provided with a valve element having a second wing portion displaced 90° from the existing wing portion. In such a valve, by positioning the first valve element wing portion in registry with the housing wing portion, the valve can be locked in the closed position and by positioning the second valve element wing portion in registry with the housing wing portion, the valve may be locked in the open position. Included in the types of attachments that have been developed are a two-piece housing assembly adapted to enclose an entire valve installed in a line and be locked together to prevent unauthorized access to the operating mechanism of the valve, and a cover device adapted to enclose the upper operating mechanism of a valve and be locked to the valve, again to prevent unauthorized access to the operating mechanism of the valve.

With hundreds of thousands of valves installed and in service in a gas distribution system, it has been found to be extremely costly for a gas utility to replace all of the valves in its system or even to provide them with cover attachments barring access to the operating mechanisms of the valves, as have been available in the prior art. It thus has been found to be highly desirable to provide all lockwing valves in service in a gas distribution system with the capability of being locked in either the open or closed position without having to incur the substantial expense of either replacing such valves or providing them with costly cover attachments.

Accordingly, it is the principal object of the present invention to provide an improved valve assembly.

Another object of the present invention is to provide an improved valve assembly adapted to be locked in either the open or closed position.

A further object of the present invention is to provide an improved valve assembly for use in a natural gas, oil or water distribution system that is capable of being locked in either the open or closed position.

A still further object of the present invention is to provide an improved lock assembly for a valve.

Another object of the present invention is to provide an improved lock assembly for a valve capable of locking the valve in either the open or closed position.

A further object of the present invention is to provide an improved lock assembly for a lockwing type of valve that permits the valve to be locked in either the open or closed position.

A still further object of the present invention is to provide a novel adapter suitable for use in a valve assembly normally capable of being locked only in a closed position, providing for rendering the assembly to be locked in either the open or closed position.

Another object of the present invention is to provide an adapter for a lockwing type of valve that will permit the valve to be locked in either the open or closed position.

A still further object of the present invention is to provide a novel adapter for a lockwing type of valve that will render the valve capable of being locked in either the open or closed position which is simple in design, comparatively inexpensive to manufacture, easy to install and effective in performance.

Other objects and advantages of the present invention will become more apparent to those persons having ordinary skill in the art from the following description taken in conjunction with the accompanying drawings wherein.

Figure 1:
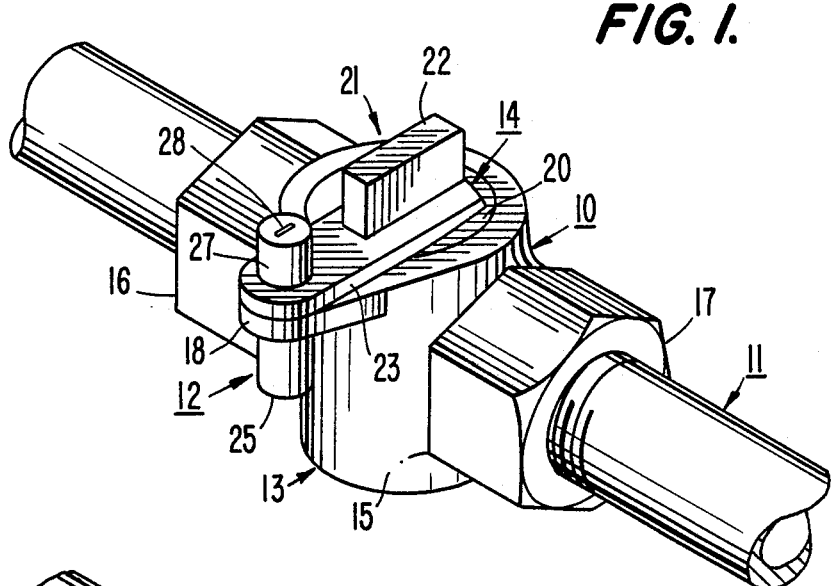
FIG. 1 is a perspective view of a conventional lockwing plug valve installed in a fluid line, illustrated in the locked closed position.
Figure 2:
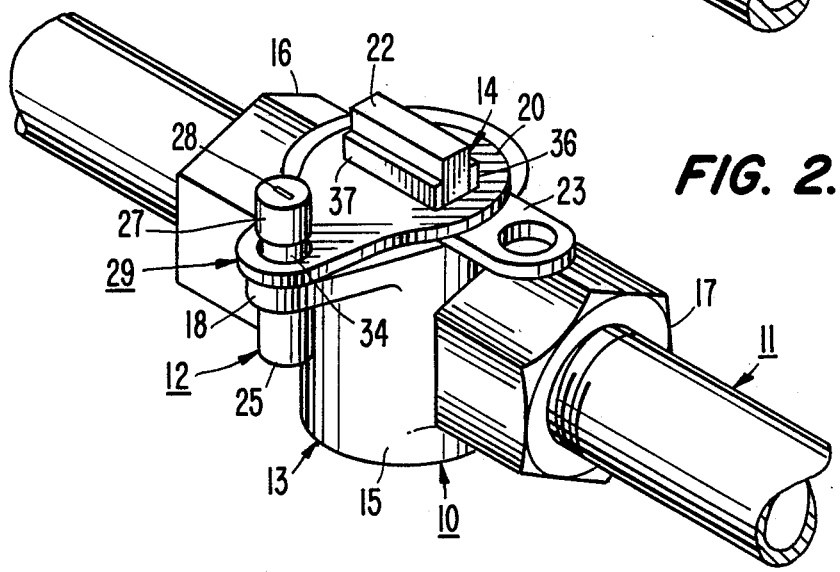
FIG. 2 is a perspective view of a valve assembly similar to the valve assembly shown in FIG. 1, embodying the present invention.
Figure 5:
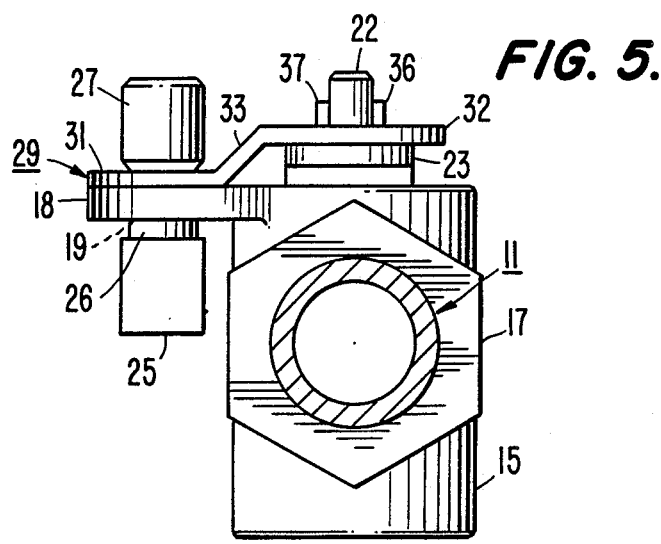
FIG. 5 is an end elevational view of the valve assembly shown in FIGS. 2 through 4.

Referring to FIG. 1 of the drawings, there is illustrated a conventional lock assembly consisting of a lockwing plug valve 10 installed in a fluid line 11 and a barrel lock 12 installed on the valve in the closed position. Valve 10 includes a housing 13 and a valve element 14. Housing 13 includes a main body portion 15 providing a valve chamber and a pair of connecting portions 16 and 17 provided with aligned, threaded ports in which portions of the fluid line are threaded. The housing further is provided with a laterally projecting wing portion 18 provided with a lock receiving opening 19 as best shown in FIG. 5.

Figure 3:
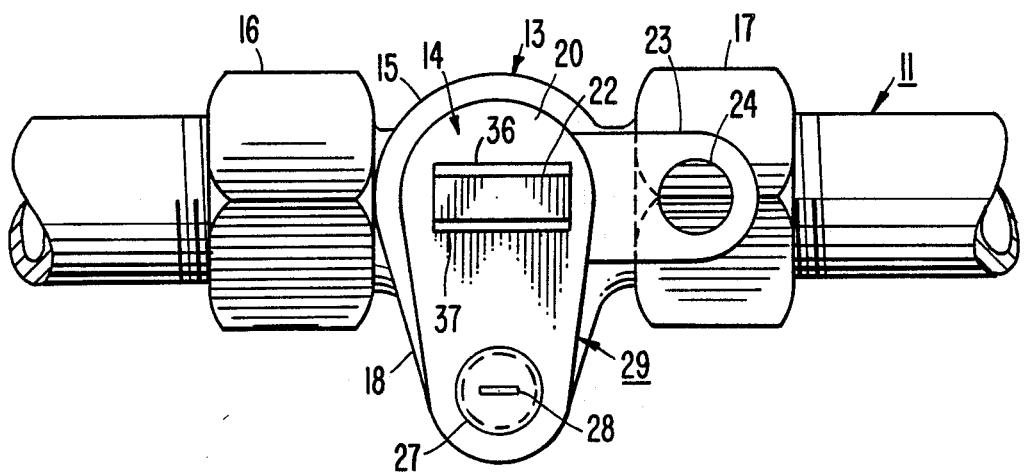
FIG. 3 is a top plan view of the valve assembly shown in FIG. 2.
Figure 4:
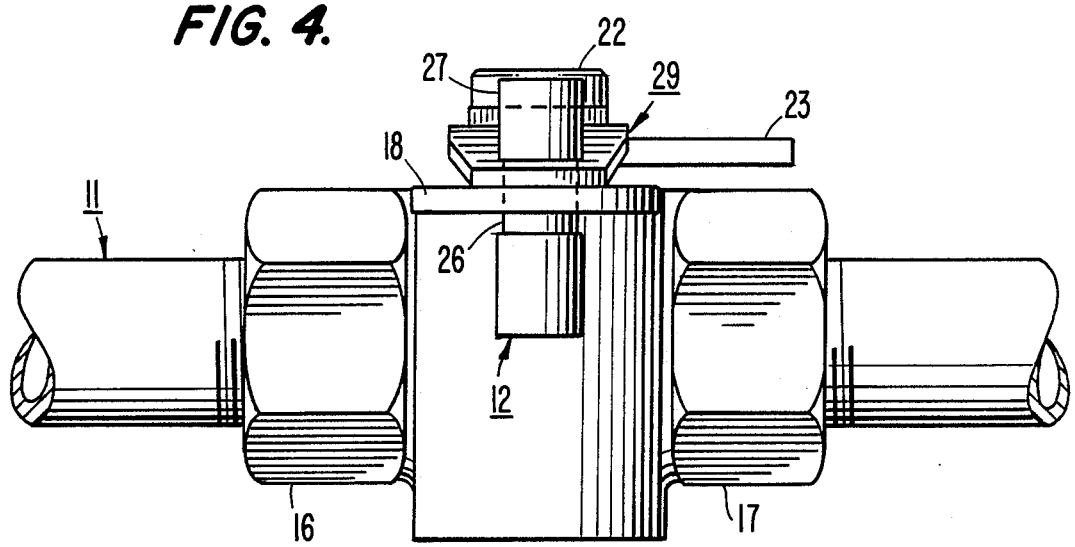
FIG. 4 is a side elevational view of the valve assembly shown in FIGS. 2 and 3.

Valve element 14 includes a main body section 20 disposed within the valve chamber and a head section 21 projecting out of the valve housing and including a nut portion 22 and a laterally projecting wing portion 23. The valve element has a vertically disposed turning axis and a passageway disposed perpendicular to the turning axis which is adapted to register with the ports of the valve chamber when the valve is in the open position. Nut portion 22 is intersected by the turning axis of the valve and has a rectangular cross-sectional configuration so that a tool such as a wrench may be applied for turning the valve element between the open and closed positions. Wing portion 23 projects radially relative to the turning axis of the valve element and is provided with a lock receiving opening 24 as best seen in FIG. 3. When valve element 14 is in the closed position as illustrated in FIG. 1, opening 24 registers with opening 19 of housing wing portion 18 for receiving barrel lock 12 therethrough.

Barrel lock 12 is of a conventional construction including an end section 25 having a diameter larger than either of openings 19 and 24 and an axially projecting portion 26 having a diameter smaller than either of the diameters of openings 19 and 24 and insertable through such openings, and an end section 27 having a diameter greater than the diameters of openings 19 and 24 and an axial opening for receiving reduced portion 26 therein in locking relation. The valve may be locked in the closed position as shown in FIG. 1 by turning the valve element to register wing portion opening 24 with wing portion opening 19, inserting reduced portion 26 of lock section 25 up through the registered openings and applying lock section 27 on the upper end of reduced section 26 so that locking elements on reduced portion 26 and in lock section 27 cooperate to secure the lock sections together. When it is desired to remove the lock as when it may be desired to open the valve, a key may be inserted into a key hole 28 provided in lock section 27 to disengage the locking elements and allow the removal of lock section 27 from reduced portion 26 of lock section 25 and the removal of lock section 25 from the registered openings.

Figure 6:
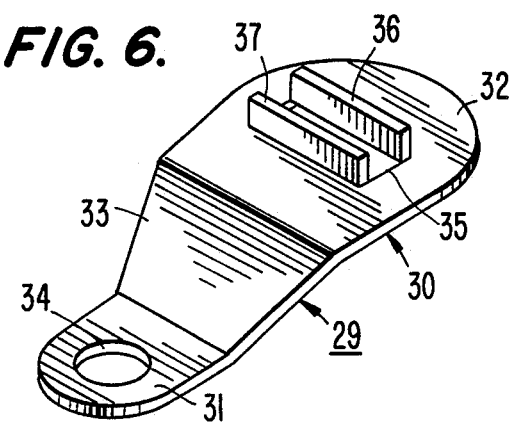
FIG. 6 is a perspective view of the adapter utilized in the valve assembly shown in FIGS. 2 through 5.

The conventional valve assembly as described is adapted to lock the valve only in the closed position as illustrated in FIG. 1. The embodiment of the invention shown in FIGS. 2 through 5, however, allows the assembly shown in FIG. 1 to be locked either in the closed or open positions. Such embodiment includes the valve 10, the barrel lock 12 and an adapter 29 as best illustrated in FIG. 6. The adapter 29 consists of a plate member 30 including a first body section 31, a second body section 32 and a third body section 33 which attaches the first and second body sections 31 and 32 and is disposed at an angle relative to each of the first body section 31 and the second body section 32. The angular displacement provided by third body section 33 is provided to prevent interference of the adapter with the main body of the valve when the adapter is being applied.

The first body section 31 is provided with an opening 34 which is adapted to register with opening 19 of housing wing portion 18. The second body section 32 is provided with an opening 35 which has a rectangular cross-sectional configuration. The opening 35 has two parallel outwardly projecting flange portions 36 and 37 along each longitudinal edge of the rectangular opening. The opening 35 is adapted to receive the nut portion 22 of the valve element 14. When the valve is in the open position and the nut portion 22 is received in the opening 35, the opening 34 of the first body section 31 will be aligned with the opening 19 of the housing wing portion 18. With the various components of the assembly thus positioned, barrel lock 12 may be applied to lock the valve in the open position.

To change the valve assembly from the locked closed position as shown in FIG. 1 to the locked open position shown in FIGS. 2 through 5, lock 12 is first unlocked and removed, and a wrench is applied to nut portion 22 to turn the valve element 90° so that the valve element wing portion 23 is positioned as shown in FIGS. 2 through 5. Adapter 29 is then applied by lowering adapter 29 over valve element 14 such that nut portion 22 protrudes through opening 35 of adapter 29; aligning opening 34 of the adapter with opening 19 of the housing wing portion 18; inserting reduced portion 26 of lock section 25 up through the lower ends of registered openings 19 and 34; and then mounting lock section 27 on upwardly protruding portion 26 of lock section 25 to snap the lock sections together in locking relation. To change the valve assembly back to the locked closed position, the procedure is essentially reversed. The lock is removed, the adapter is then removed, the valve element is turned 90° so that opening 24 of valve element wing portion 23 is again registered with opening 19 of housing wing portion 18 and lock 12 is then reapplied.

Adapter 29 preferably is formed of steel although it may be formed of any other metal or suitably sturdy material adapted not to be compromised by tampering. It may be formed by stamping it from a metal plate, bending two portions of the plate to form the outwardly projecting flange portions and drilling or otherwise forming the openings for receiving the nut portion and barrel lock.

Alternatively, the outwardly projecting flange portions may be separate pieces attached to the plate by means such as welding. It should be noted that the flange portions are a preferred feature of the invention and the omission of these legs will not render the adapter unworkable. Additionally, nut portion 22 can be any shape feasible and is not to be restricted to the rectangular cross-sectional configuration described herein. Furthermore, any form of lock can be used, including a padlock. The configuration of the adapter also may be varied, the critical aspects of the adapter being the ability to assure the locking of the valve in the open position and the avoidance of interference with the valve body in order to accommodate the application of the adapter.

It will be appreciated that with an adapter of the type as illustrated and described, valves of the type shown in FIG. 1 presently in service can readily be transformed into valves that may be locked in either the open or closed position to comply with applicable federal and state code requirements. Such adapter allows the transformation of such valve installations without incurring the cost of either replacing such valves with valves designed to be locked in the open or closed position or providing existing valves with various enclosure devices preventing access to the operating mechanisms of such valves.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An adapter for a valve assembly including a valve having a housing and a valve element disposed in said housing and movable between closed and open positions, said valve element having a nut portion projecting out of said housing, said nut portion having a cross-sectional configuration such that a tool ma be applied for turning said valve element between the closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, and detachable means for locking said valve element and housing securing portions together when said portions are disposed in lockable relation whereby said valve assembly can be locked in the closed position only, said adapter comprising:

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open post ion, said rigid member being removable when said valve element is moved back to said first lockable position;

said first securing means cooperable with said nut portion comprising an opening in said rigid member whereby said nut portion protrudes through said opening.

2. An adapter according to claim 1 wherein said opening has a rectangular cross-sectional configuration.

3. An adapter according to claim 2 wherein said opening has two parallel outwardly projecting flange portions along each longitudinal edge of said rectangular cross-sectional configuration.

4. An adapter for a valve assembly including a valve having a housing and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first positions when said valve element is in the closed position and a second position when said valve element is in the open position, said housing having a securing portion disposed in lockable relation with said valve element securing portion when said valve element securing portion is in said first position, and detachable means for locking said valve element and housing securing portions together when said portions are disposed in lockable relation whereby said valve assembly can be locked in the closed position only, comprising:

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said second securing means comprising an opening in said rigid member registrable with an opening in said housing securing portion for receiving a restraining element of said locking means therethrough.

5. An adapter for a valve assembly including a valve having a housing and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is in the open post ion, said housing having a securing portion disposed in lockable relation with said valve element securing portion when said valve element securing portion is in said first position, and detachable means for locking said valve element and housing securing portions together when said portions are disposed in lockable relation whereby said valve assembly can be locked in the closed position only, comprising:

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said rigid member comprising a first body section including said first securing means, a second body section including said second securing means and a third body section interconnecting said first and second body sections, said third body section being disposed at an angle relative to each of said first and second body sections.

6. A lock assembly for a valve having a housing and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is in the open position, said housing having a securing potion disposed in lockable relation with said valve securing portion when said valve element securing portion is in said first position whereby said valve can be locked in the closed position only comprising:

detachable means for locking said housing and valve element portions together when said valve element securing means is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said first securing means cooperable with said nut portion comprising an opening in said rigid member whereby said nut portion protrudes through said opening.

7. A lock assembly according to claim 6 wherein said opening has a rectangular cross-sectional configuration.

8. A lock assembly according to claim 7 wherein said opening has two parallel outwardly projecting flange portions along each longitudinal edge of said rectangular cross-sectional configuration.

9. A lock assembly for a valve having a housing and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is in the open position, said housing having a securing portion disposed in lockable relation with said valve securing portion when said valve element securing portion is in said first position whereby said valve can be locked int he closed position only comprising:

detachable means for locking said housing and valve element portions together when said valve element securing means is in said first position and said valve element is in the closed position whereby said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said second securing means comprising an opening in said rigid member registrable with an opening in said housing securing portion for receiving a restraining element of said locking means therethrough.

10. A lock assembly for a valve having a housing and a valve element disposed in said housing and movable between closed and open positions, said valve element having a nut portion projecting out of said housing, said nut portion have a cross-sectional configuration such that a tool may be applied for turning said valve element between the closed and open positions, said valve element having a securing portion movable between a first position when said valve element is in the closed position and a second position when said valve element is in the open position, said housing having a securing portion disposed in lockable relation with said valve securing portion when said valve element securing portion is in said first position whereby said valve can be locked in the closed position only comprising:

detachable means for locking said housing and valve element portions together when said valve element securing means is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said rigid member comprising a first body section including said first securing means, a second body section including said second securing means and a third body section interconnecting said first and second body sections, said third body section being disposed at an angle relative to each of said first and second body sections.

11. A valve assembly comprising:

a valve having a housing provided with inlet and outlet ports and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position whereby said valve is adapted to be secured in the closed position only;

detachable mans for locking said housing and valve element portions together when said valve element securing means is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said first securing means cooperable with said nut portion comprising an opening in said rigid member whereby said nut portion protrudes through said opening.

12. A valve assembly according to claim 11 wherein said opening has a rectangular cross-sectional configuration.

13. A valve assembly according to claim 12 wherein said opening has two parallel outwardly projecting flange portion along each longitudinal edge of said rectangular cross-sectional configuration.

14. A valve assembly comprising:

a valve having a housing provided with inlet and outlet ports and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is int he open position, said housing having a securing portion disposed in lockable relation with said valve element securing portion when said valve element securing portion is in said first position whereby said valve is adapted to be secured in the closed position only;

detachable mans for locking said housing and valve element portions together when said valve element securing means is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said second securing means comprising an opening in said rigid member registrable with an opening in said housing securing portion for receiving a restraining element of said locking means therethrough.

15. A valve assembly according to claim 14 wherein said locking means comprises a barrel lock.

16. A valve assembly comprising:

a valve having a housing provided with inlet and outlet ports and a valve element disposed in said housing and movable between closed and open positions, said valve element having a nut portion projecting out of said housing, said nut portion having a cross-sectional configuration such that a tool may be applied for turning said valve element between the closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position whereby said valve is adapted to be locked in the closed position only;

detachble means for locking said housing and valve element portions together when said valve element securing means is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said rigid member comprising a first body section including said first securing means, a second body section including said second securing means and a third body section interconnecting said first and second body sections, said third body section being disposed at an angle relative to each of said first and second body sections.

17. A valve assembly comprising:

a valve having a housing provided with inlet and outlet ports and a valve element disposed in said housing and movable between closed and open positions, said valve element having a nut portion and a wing portion, said nut portion projecting out of said housing and having a cross-sectional configuration such that a tool may be applied for turning said valve element between the closed and open positions, said wing portion having an opening therein movable between a first position when said element is in the closed position and a second position when said valve element is in the open position, said housing having wing portion provided with an opening therein disposed in lockable relation with said valve element wing portion when said valve element is in said first position whereby said valve can be locked in the closed position only;

a barrel lock removably mountable in registered openings of said wing portions when said valve element wing portion is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said first securing means cooperable with said nut portion comprising an opening in said rigid member whereby said nut portion protrudes through said opening.

18. A valve assembly according to claim 17 wherein said opening has a rectangular cross-sectional configuration.

19. A valve assembly according to claim 18 wherein said opening has two parallel outwardly projecting flange portions along each longitudinal edge of said rectangular cross-sectional configuration.

20. A valve assembly comprising:

a valve having a housing provided with inlet and outlet ports and a valve element disposed in said housing and movable between closed and open positions, said valve element having a nut portion and a wing portion, said nut portion projecting out of said housing and having a cross-sectional configuration such that a tool may be applied for turning said valve element between the closed and open positions, said wing portion having an opening therein movable between a first position when said element is in the closed position and a second position when said valve element is in the open post ion, said housing having wing portion provided with an opening therein disposed in lockable relation with said valve element wing portion when said valve element is in said first position whereby said valve can be locked in the closed position only;

a barrel lock removably mountable in registered openings of said wing portions when said valve element wing portion is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said second securing means comprising an opening in said rigid member registrable with an opening in said housing securing portion for receiving a restraining element of said locking means therethrough.

21. A valve assembly comprising:

a valve having a housing provided with inlet and outlet ports and a valve element disposed in said housing and movable between closed and open positions, said valve element having a nut portion and a wing portion, said nut portion projecting out of said housing and having a cross-sectional configuration such that a tool may be applied for turning said valve element between the closed and open positions, said wing portion having an opening therein movable between a first position when said element is in the closed position and a second position when said valve element is in the open position, said housing having wing portion provided with an opening therein disposed in lockable relation with said valve element wing portion when said valve element is in said first position whereby said valve can be locked in the closed position only;

a barrel lock removably mountable in registered openings of said wing portions when said valve element wing portion is in said first position and said valve element is in the closed position whereby said valve element will be locked in the closed position;

a separate rigid removable attachment member having first means cooperable with said nut portion for securing said rigid member to said valve element when said valve element securing portion has been moved to said second position, and second securing means spaced from said first securing means being aligned with said housing securing portion and said locking means for locking said rigid member to said housing securing portion when said valve element securing portion is in said second position whereby said valve element will be locked in the open position, said rigid member being removable when said valve element is moved back to said first lockable position;

said rigid member comprising a first body section including said first securing means, a second body section including said second securing means and a third body section interconnecting said first and second body sections, said third body section being disposed at an angle relative to each of said first and second body sections.

* * * * *

UNITED STATES PATENT AND TRADEMARK OFFICE
CERTIFICATE OF CORRECTION

PATENT NO. : 4,971,289

DATED : November 20, 1990

INVENTOR(S) : Eugene E. Pietras

It is certified that error appears in the above-identified patent and that said Letters Patent is hereby corrected as shown below:

Claim 1, column 5, line 39, delete "ma" and insert --may--.

Claim 5, column 6, line 57, delete "post ion" and insert --position--.

Claim 9, column 8, line 10, delete "int he" and insert --in the--; lines 14-15, delete "whereby said valve is in the closed position".

Claim 10, column 8, line 41, delete "have" and insert --having--.

Claim 14, column 10, line 4, delete "int he" and insert --in the--.

Signed and Sealed this

Seventh Day of April, 1992

Attest:

HARRY F. MANBECK, JR.

*Attesting Officer*     *Commissioner of Patents and Trademarks*